(12) United States Patent
Kumar et al.

(10) Patent No.: US 11,627,345 B1
(45) Date of Patent: Apr. 11, 2023

(54) BUFFER MANAGEMENT FOR OPTIMIZED PROCESSING IN MEDIA PIPELINE

(71) Applicant: Sling Media Pvt. Ltd., Bangaluru (IN)

(72) Inventors: Amit Kumar, Bangaluru (IN); Gopikumar Ranganathan, Bangaluru (IN)

(73) Assignee: DISH Network Technologies India Private Limited

( * ) Notice: Subject to any disclaimer, the term of this patent is extended or adjusted under 35 U.S.C. 154(b) by 0 days.

(21) Appl. No.: 17/741,255

(22) Filed: May 10, 2022

(51) Int. Cl.
 *H04N 21/234* (2011.01)
 *H04N 21/231* (2011.01)
 *H04N 21/845* (2011.01)

(52) U.S. Cl.
 CPC .. *H04N 21/23406* (2013.01); *H04N 21/23106* (2013.01); *H04N 21/8456* (2013.01)

(58) Field of Classification Search
 None
 See application file for complete search history.

(56) References Cited

U.S. PATENT DOCUMENTS

| | | | | |
|---|---|---|---|---|
| 7,382,796 B2* | 6/2008 | Haberman | ............... | H04L 9/40 725/135 |
| 7,647,614 B2* | 1/2010 | Krikorian | .......... | H04N 21/4383 725/87 |
| 8,352,685 B2* | 1/2013 | Bannon | ............... | G06F 12/0891 711/135 |
| 2003/0067872 A1* | 4/2003 | Harrell | ................. | H04L 65/752 370/477 |
| 2004/0078829 A1* | 4/2004 | Patel | ................. | H04N 21/4334 348/E7.071 |
| 2007/0192812 A1* | 8/2007 | Pickens | ................ | H04L 1/1812 348/E7.071 |
| 2013/0091297 A1* | 4/2013 | Minder | ................... | H04L 65/80 709/231 |
| 2014/0157341 A1* | 6/2014 | Malin | ...................... | H04N 9/79 725/110 |
| 2014/0317672 A1* | 10/2014 | Ramakrishnan | ....... | H04N 7/162 725/116 |
| 2019/0306551 A1* | 10/2019 | Arye | ................... | H04N 21/8456 |

\* cited by examiner

*Primary Examiner* — Alexander Q Huerta
(74) *Attorney, Agent, or Firm* — KW Law, LLP

(57) ABSTRACT

Automated processes, computing systems, computing devices, and other aspects of a data processing system improve reliability in transmitting digital media content over a network using resource constrained hardware. Media content may be received from a media source and used to generate data segments. An address may be written to a message queue, with the address referencing a first segment of the media content stored in the buffer. A computing device may check whether a number of addresses stored in a message queue is greater than or equal to a first threshold value. A second segment of the media content may be written to the message queue in response to the number of addresses stored in the message queue being greater than or equal to the first threshold value.

20 Claims, 6 Drawing Sheets

BUFFER MANAGEMENT FOR OPTIMIZED PROCESSING IN MEDIA PIPELINE

TECHNICAL FIELD

The following discussion generally relates to media signal transmission. Various embodiments may be used in connection with media players, placeshifting devices, digital video recorder (DVR) devices, video game players and/or any other devices that transmit or receive streaming media or other digital content via the Internet or a similar network.

BACKGROUND

In the past, television viewing typically occurred at home, with one or more family members gathered in front of a television to watch a broadcast program. While conventional television viewing continues to be a popular activity, media streaming is becoming increasingly commonplace. Many viewers now watch their television and other media content as media streams delivered to phones, tablets, portable computers, or other mobile devices. Other devices such as video game players, digital video recorders, television receivers, set top boxes and other media devices are becoming increasingly capable of handling streaming media content, and these have been well-received by viewers.

As viewers enjoy their content on a variety of playback devices, their expectations grow regarding reliability and speed of media streams received on different devices over a wide variety of networks. Placeshifting devices at homes can present particular challenges due to their typically limited technical capabilities. Placeshifting devices installed in user homes may have relatively low processing power, caching capacity, and memory speed for encoding and transmitting media to user devices, which can present challenges. For example, processing or memory limitations may cause some media sources to lose data when a burst output is generated or when media data is otherwise received faster than it is encoded or transmitted. These conditions can lead to undesirable data loss.

It is therefore desirable to create devices, systems, and automated processes to transmit streaming media content from devices with limited technical capabilities to client devices operating on the Internet or other wide area networks. It is particularly desirable to transmit media content from devices having limited processing and caching capabilities without losing data during burst conditions or other adverse conditions. Other desirable features and characteristics will become apparent from the subsequent detailed description and the appended claims, taken in conjunction with the accompanying drawings and this background section.

BRIEF DESCRIPTION

Various embodiments relate to different automated processes, computing systems, devices, and other aspects of a data processing system that is executed by a processor of a server device to ingest media content with a buffer using pointers instead of block copies when resources are available. The automated process includes receiving media content from a media source and generating data segments from the media content. A first address referencing a first segment of the media content stored in the buffer is written to a message queue. The process checks whether a number of addresses stored in a message queue is greater than or equal to a first threshold value. A second segment of the media content is written to the message queue in response to the number of addresses stored in the message queue being greater than or equal to the first threshold value.

Some embodiments provide an automated process performed by a server device wherein the first threshold value may be equal to a maximum length of the buffer. The maximum length of the buffer is equal to a maximum number of data segments that fit into the buffer. The data segments comprise multi-bitrate segments. The buffer is stored in a cache-level memory of the server device. The message queue is stored in main memory of the server device, with main memory having slower read and write speeds than the cache-level memory. The server device checks whether the number of addresses stored in the message queue is less than or equal to a second threshold value. The server device writes to the message queue a second address referencing a third segment of the media content stored in the buffer in response to the number of addresses stored in the message queue being less than or equal to the second threshold value. The second threshold value may be 1 in this example.

In various embodiments, an automated process executed by a processor of a server device ingests media content. The automated process includes the steps of receiving the media content from a media source, preparing segments of the media content for consumption using a first thread, and writing to a message queue an address of a first segment from the segments stored in a buffer using the first thread. The first thread writes the address in response to the processor being in a copy reference mode. The first thread switches into copy data mode in response to detecting a first switching condition of the message queue. The first thread writes a second segment of the media content to the message queue in response to the processor being in the copy data mode. The first thread switches into the copy reference mode in response to detecting a second switching condition of the message queue.

In this example, the automated process detects the second switching condition of the message queue by checking whether the number of addresses stored in the message queue is greater than or equal to a threshold value. The first thread writes to the message queue a second address referencing a third segment of the media content stored in the buffer in response to the number of addresses stored in the message queue being greater than or equal to the threshold value. The threshold value is a maximum length of the buffer. The segments can include multi-bitrate segments. The buffer is stored in a cache-level memory of the server, and the message queue is in main memory of the server device. Main memory typically has slower read and write speeds than the cache-level memory. Detecting the second switching condition of the message queue includes checking whether the number of addresses stored in the message queue is less than or equal to a threshold value. A second address referencing a third segment of the media content stored in the buffer is written to the message queue in response to the number of addresses stored in the message queue being less than or equal to the threshold value. A second thread consumes the address of the first segment and read the first segment from the buffer to encode the media content. The message queue comprises a first-in-first-out queue.

Other embodiments could relate to a server device comprising a processor, a non-transitory data storage, and an interface to a network, wherein the non-transitory data storage is configured to store computer-executable instructions that, when executed by the processor, perform an automated process to ingest media content for transmission on the network. The automated process includes receiving the media content from a media source, generating a plurality of data segments from the media content, and writing a first address to a message queue. The first address references a first segment of the media content stored in a buffer. The process includes checking whether a number of addresses stored in the message queue is greater than or equal to a first threshold value. The processor switches into a copy data mode in response to the number of addresses stored in the message queue being greater than or equal to the first threshold value. Other devices, systems, and automated processes may be formulated in addition to those described in this brief summary section.

DRAWINGS

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Various embodiments encode digital media content using a buffer in cache memory and a message queue in main memory. A producer thread stores media segments in the buffer and adds pointers to the media segments to the message queue. The mode of operation in which references are written to the message queue is referenced herein as copy reference mode. Operating in copy reference mode tends to result in fast ingestion of media into server devices having limited processing power, caching capacity, or memory speed.

The buffer may fill, nearly fill, or be at risk of filling as a result the producer thread generating media segments faster than messages are consumed from the message queue. A burst of incoming data, for example, can cause the producer thread to fill the buffer with media segments faster than a consumer thread consumes media segments. The message queue may copy media segments instead of references into the message queue to mitigate a data burst or a filling buffer. The mode of operation in which media segments are copied directly to the message queue is referred to herein as copy data mode. Switching to copy data mode tends to prevent data loss when the buffer is operating at or near full capacity. Switching between copy reference mode and copy data mode as conditions warrant can greatly improve the performance of the digital encoder.

Figure 1:
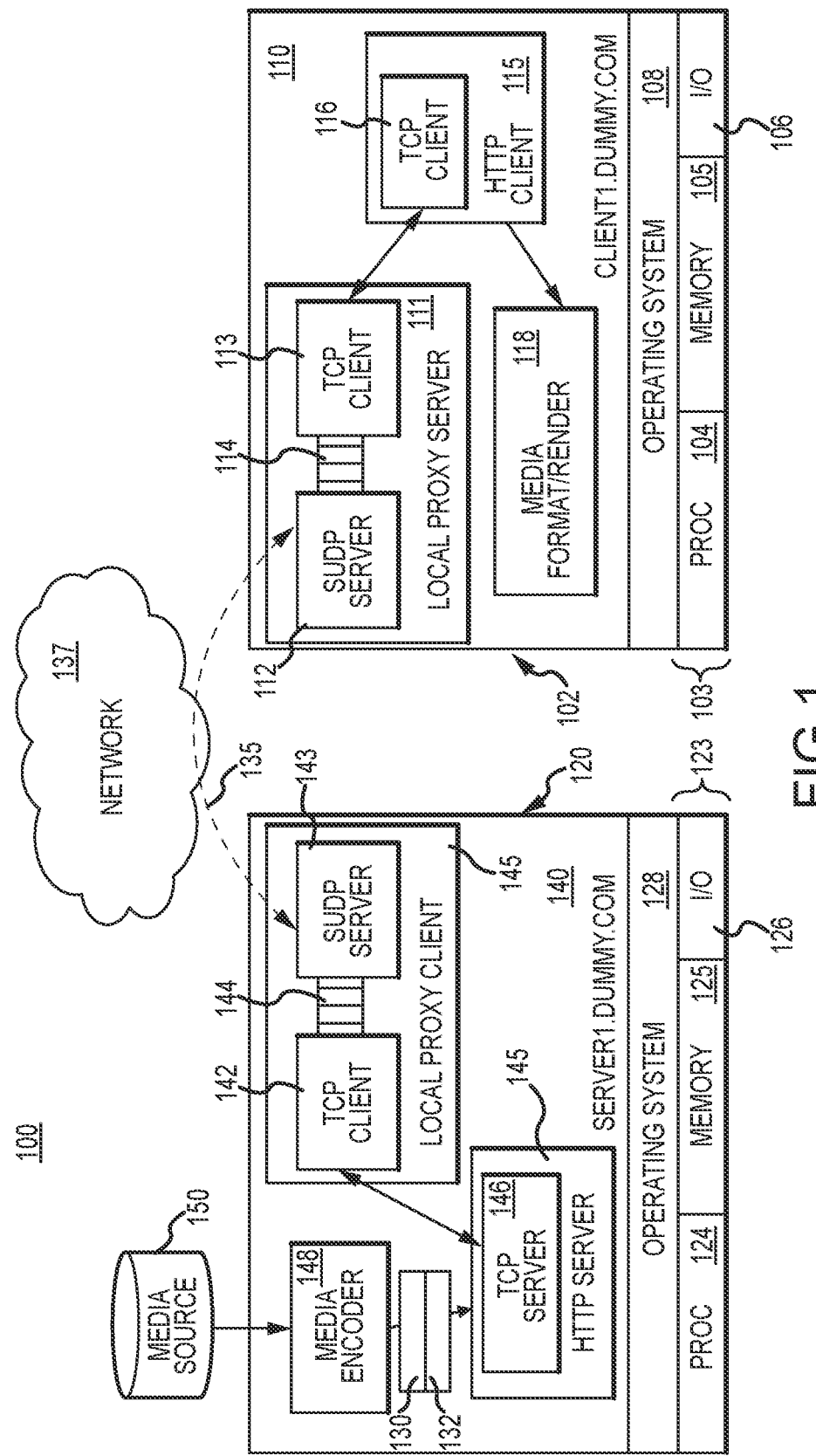
FIG. 1 illustrates an example of a system for transmitting streaming media content from a server device to a client device on a network.

In the embodiment illustrated in FIG. 1, a client device 102 contacts a server device 120 to establish a connection 135 via network 137. The server device 120 may provide media streams to the client 102, such as time and/or place shifted video, video on demand, other digital media content, and/or the like. In the illustrated example, client-side logic 115 executed by client device 102 suitably formats secure hypertext transfer protocol (HTTPS) or similar requests for content. Rather than transmitting the formatted requests directly on network 137, the client device 102 provides the transmission control protocol (TCP) formatted content to a proxy server in that operates on the same device 102 as the TCP client 116. In various embodiments, the TCP client 116 and proxy server 111 exchange messages using a "dummy" address (e.g., "client1.dummy.com" in the example of FIG. 1) that may not be directly routable on network 137. The proxy server 111 receives the TCP-formatted requests and encapsulates the packets within a secure user datagram protocol (UDP) type transport layer for transmission to server device 120 via network 137. The connectionless packets may use conventional internet protocol (IP) addresses or the like that identify client device 102 and server device 120 on network 137, as appropriate.

The server device 120 suitably receives the encapsulated request via network 137. A proxy client 141 executed by the server device 120 suitably extracts the previously encapsulated TCP/HTTPS content from the secure UDP-type packets, re-assembles the TCP/HTTPS content as needed, and provides the extracted content to the hypertext transfer protocol (HTTP) server 145 for authentication, authorization, decryption, and/or other processing as needed.

In various embodiments, server device 120 formats the video content to be delivered in HTTPS structures that are designed for delivery via reliable, connection-based transport connection protocols (TCP). An HTTPS server 145 operating at the server device 120 suitably formats content for connection-based delivery and then supplies the formatted content to a proxy client 141 operated by server device 120 that encapsulates the TCP content for delivery over network 137 via UDP or the like. The client device 102, conversely, requests and receives secure content via network 137 at a proxy TCP server that delivers content to an HTTP client 115, as appropriate.

FIG. 1 shows an example of a system 100 in which a client device 102 obtains streaming content from a server 120 via a wide area network 137. The server device 120 includes a proxy client 141 that receives secure content from a TCP server 145 and embeds the secure content into connectionless transport layer structures for transmission across network 137. The secure UDP-like structures may appear as UDP packets to network routers and the like but can be modified to include additional data representing additional port numbers and/or packet tracking information, as described above.

As noted above, addressing used for HTTPS communications can be abstracted by using a separate uniform resource locator (URL) or other address for the embedded secure data. The TCP server 146 in server device 120 and the TCP client 116 in client device 102 may use a separate domain name (e.g., "dummy.com", "commondomain.com", "dishboxes.com", etc.) for intra-application communications, if desired. Various embodiments could further use local addresses as sub-domains, e.g., in the form of "localip.commondomain.com" or the like, for further convenience. The shared domain can be registered with a network information center or the like for cryptographic key management and verification, if desired. Intra-device communications between TCP server 146 and TCP client 142 in server device 120, then, will typically use a different address than communications between client device 102 and server device 120. Similarly, TCP client 116 and TCP server 113 in client device 102 will generally use separate addresses, as appropriate. In some implementations, the "dummy" or proxy addresses can be used to abstract the UDP-type encapsulation from the TCP client 116 and TCP server 146. That is, these modules may simply communicate with each other using the "proxy" addresses without regard to the actual IP or other network addresses used on network 137, if desired.

Network 137 is any wide area network (WAN) such as the Internet, a telephony network, a public or private network of any sort, or the like. Network 137 may be based upon TCP/IP protocols, or any other protocols as desired, including any protocols subsequently developed. Equivalent embodiments may provide device location and/or streaming via local area networks, as appropriate.

Server device 120 is any sort of network device having conventional hardware 123 such as a processor 124, memory 125, and input/output interfaces 126 (e.g., a network interface), and any operating system 128 to support a media server application 140 having various processing routes and modules. In the example illustrated in FIG. 1, server device 120 suitably executes a media server application 140 that includes at least two portions corresponding to an HTTPS server 145 and a proxy client 141, as described herein. Server application 140 may also include media encoder 148 for retrieving and/or encoding video segments, as well as routines for key management, user/client authentication, and the like.

In some embodiments, server device 120 uses buffer 130 to receive media content from media source 150 and also to encode media content for transmission to client device 102 over network 137. Buffer 130 is stored in fast memory having limited capacity, if needed. For example, buffer 130 may be stored in cache level memory on a device with limited computing power. Buffer 130 may be one or more circular buffers.

Buffer 130 may support multi-bitrate streaming in various embodiments. For example, buffer 130 may include four circular buffers, with each circular buffer of buffer 130 storing data segments (also referred to herein as segments) for a different quality of streaming video. Multi-bitrate streaming is described in greater detail in U.S. Pat. Nos. 8,868,772 and 9,998,516, which are incorporated by reference for any purpose.

Segments written to buffer 130 by a producer thread running on processor 124 may be consumed during encoding by a consumer thread running on processor 124 in some embodiments. The producer thread writing segments to buffer 130 communicates with the consumer thread using a message queue 132, function calls, and/or callbacks. In copy reference mode, the producer thread writes data segments to buffer 130 and may also write an address or reference to data segments stored in buffer 130 to the message queue. The producer thread running on server device 120 generally operates in a copy reference mode when writing addresses or references to message queue 132. In the example of FIG. 1, the producer thread is media encoder 148 and the consumer thread is HTTP server 145, although other embodiments could use other producer or consumer threads.

The consumer thread consumes messages from message queue 132. The messages may include addresses or references in response to server device 120 operating in a copy reference mode. Copy reference mode tends to reduce the computing resources used by server device 120 by reducing the number of memory copy operations used by server device 120. The conservation of computing resources stems from server device 120 storing a reference or pointer to the location of a media segment in cache when operating in copy reference mode. Storing a reference to a media segment in memory tends to be less resource intensive than copying the same media segment into memory.

The consumer thread reads the segment identified by the reference stored in message queue 132 from buffer 130. Server device 120 may thus avoid resource-intensive memory copy operations that would otherwise be used to make copies of data segments for later retrieval by the consumer thread. In the example of FIG. 1, HTTP server 145 acts as the consumer thread to buffer 130, although other embodiments could use different consumer threads.

In various embodiments, server device 120 encounters conditions causing the producer thread to write segments to buffer 130 and addresses to message queue 132 faster than the consumer thread consumes addresses from message queue 132 and reads the identified segments from buffer 130. For example, a burst of data from media source 150 may result in the producer thread filling buffer 130 faster than the consumer thread can empty buffer 130, thereby creating stalls in processing, data loss, or other undesirable conditions. To prevent this, server device 120 switches into a copy data mode when an overflow or burst condition on buffer 130 or message queue 132 is detected.

In embodiments suitable for multi-bitrate streaming, server device 120 may divide buffer 130 and message queue 132, so that different parts of buffer 130 and message queue 132 are assigned to each of the different bitrate streams. Server device 120 may include multiple buffers 130 and multiple message queues 132 in such embodiments. For example, buffer 130 may be divided into four buffers having similar or equal length for multi-bitrate streaming content that processes four different bitrates. Buffer length may represent the number of data segments from a bitrate stream that fit into a buffer. Continuing the foregoing example, buffer 130 may have a total buffer length of 16 divided among four different bitrate streams, with each stream having a buffer of length 4. Other buffer capacities and lengths may be used depending on system capacity, video quality, or other system characteristics.

In various embodiments, server application 140 obtains media content from a media source 150. Media source 150 may be a television tuner or a storage device that is formatted to include a database of media content, although other embodiments may operate in any other manner or receive content from any other source. In the example illustrated in FIG. 1, the various functions and modules of server application 140 are implemented using software or firmware logic that is stored in memory 125 for execution by processor 124, although other embodiments could use equivalent computing hardware to perform the various functions, as desired.

Examples of different types of server devices 120 could include any streaming media source such as a file server or content delivery network (CDN), a video game device, a time and/or placeshifting device, and/or the like. In some implementations, server device 120 is a home-type server such as a local storage digital video recorder (LSDVR), placeshifting device, and/or other media server device. One example of a server device 120 used in some implementations could be the AirTV Classic device that is available from http://www.airtv.net, although equivalent embodiments could be used with any number of other DVRs, media receivers/players, video on demand (VOD) servers, set top boxes, video game consoles, time or place shifting devices, and/or the like. U.S. Pat. No. 7,795,062 provides additional detail about several examples of place shifting devices and techniques. Equivalent concepts could be implemented in any number of other devices or systems.

Media server application 140 may be designed and implemented in any manner. In the example shown in FIG. 1, server application 140 suitably includes a media encoder 148, an HTTP server 145, and a local proxy client 141 as described herein. The media encoder 148 obtains content from a database or other media source 150, as desired. Content may be formatted into adaptive streaming segments such as those described in US Patent Publication No. 2020/0389510 or the like, and other embodiments may use different encoding and delivery schemes.

As shown in FIG. 1, HTTP server 145 provides authentication, authorization, and encryption/decryption in accordance with HTTP/HTTPS protocols. HTTP server 145 consumes content from buffer 130 using references in message queue 132 to access the referenced location in buffer 130 storing the content. Pointers, counters, index values, or other techniques may be used indicate content has been consumed from a referenced location in buffer 130 in response to operation in copy reference mode.

FIG. 1 also shows a TCP server 146. In practice, higher level HTTP/HTTPS content can be encapsulated within TCP frames for transmission over an internet protocol network such as the internet. In this example, however, TCP packets are provided within media server application 140 to TCP client 142 operating as part of local proxy client 141. The TCP client 142 handles interactions with the TCP/HTTP server 145, thereby abstracting network 137 from the server 145. As noted above, received TCP packets are appropriately encapsulated within connectionless UDP-type transport layer frames by the UDP server 143. In the example of FIG. 1, UDP server 143 is indicated as a "SUDP" server for "secure UDP", "Sling UDP", "specialized UDP", "supplemented UDP" or the like. In various embodiments, TCP packets received by TCP client 142 are stored in a buffer 144 or the like until they can be processed by UDP server 143. Buffer 144 may make use of memory 125 and/or any other data storage available to server device 120, as appropriate. Buffer 144 may also store packets moving in the opposite direction. That is, connectionless packets received via network 137 may be stripped of their UDP-type encapsulation and stored in buffer 144 prior to forwarding by TCP client 142, as desired.

Client device 102 is any device capable of communicating on network 137 to obtain data or services from server 120. In various embodiments, client device 102 is a mobile phone, tablet, computer, and/or the like that interfaces with network 137 via hardware (e.g., processors, memory, input interfaces, and the like) and any operating system 108 capable of supporting a client application 110. Client application 110 typically includes at least two portions corresponding to a proxy server in and an HTTP client 115, as described herein. Client application 110 may further include additional logic 118 for media decoding, sequencing, rendering, and/or the like. In various embodiments, client application 110 and its various components are implemented using software or firmware logic that is stored in memory 105 for execution by processor 104. Equivalent embodiments could use other computing structures and systems to implement similar features, as desired.

As described above, proxy server 111 suitably includes an SUDP client 112 that receives connectionless packets from server 120 via network 137 and TCP server 113 that serves de-encapsulated TCP/HTTP packets to HTTP client 115. Proxy server 111 may also include a buffer 114 that allows for temporary storage of packets exchanged between SUDP client 112 and TCP server 113. Buffer 114 may use memory 105 or other data storage available to client device 102, as desired.

HTTP client 115 performs HTTP/HTTPS encoding, including processing of digital certificates, encryption, and the like. As noted above with regard to HTTP server 145, HTTP constructs may be transported using a TCP stack prior to encapsulation within connectionless UDP-type frames, as desired. In some implementations, the local addressing used between HTTP client 115 and HTTP server 145 could be compatible such that the UDP encapsulation and transmission on network 137 are transparent to the HTTP client 115 and HTTP server 145, as desired. Again, various embodiments could use any protocols, as desired.

Figure 2A:
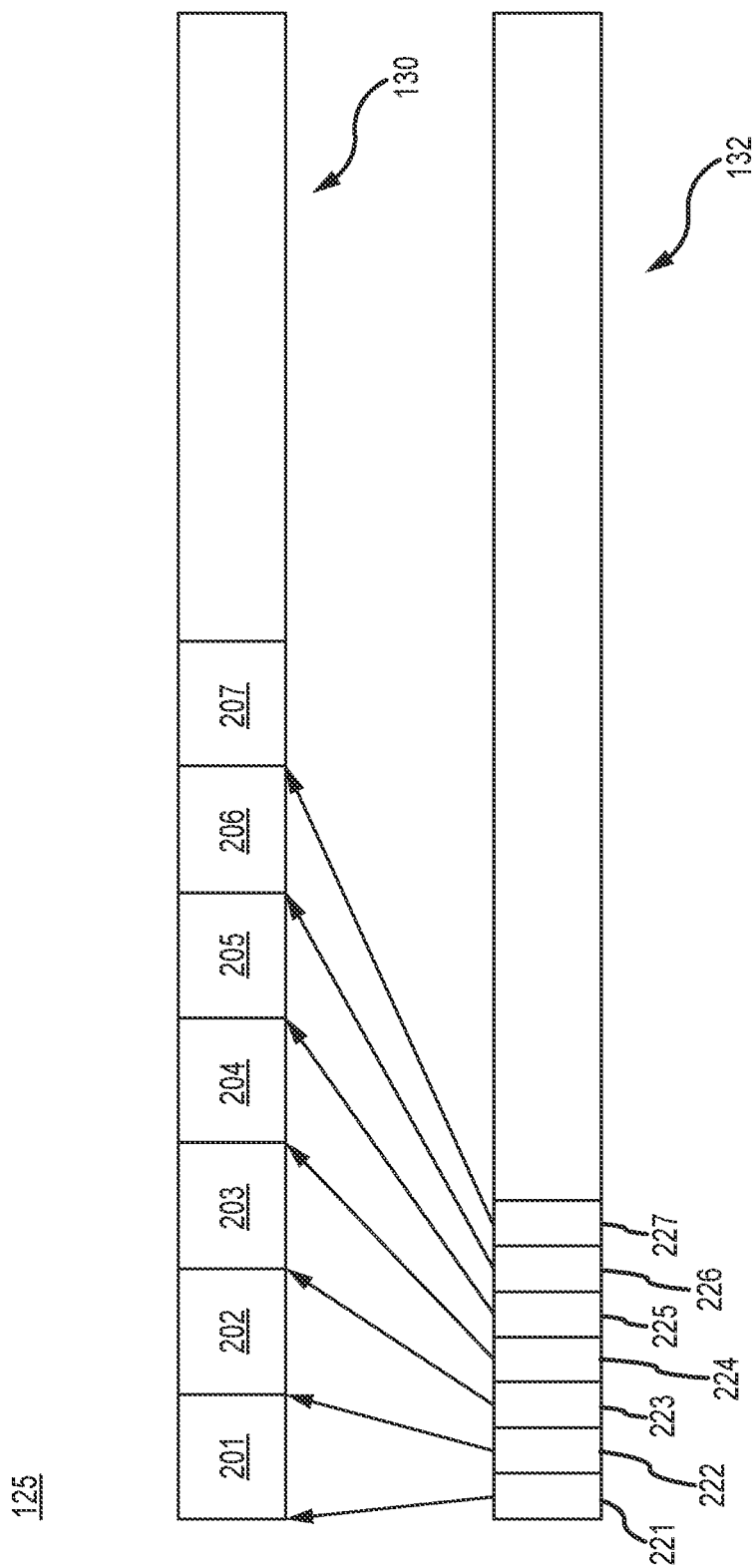
FIG. 2A illustrates an example of a circular buffer with data segments referenced by addresses stored in a messaging queue.
Figure 2B:
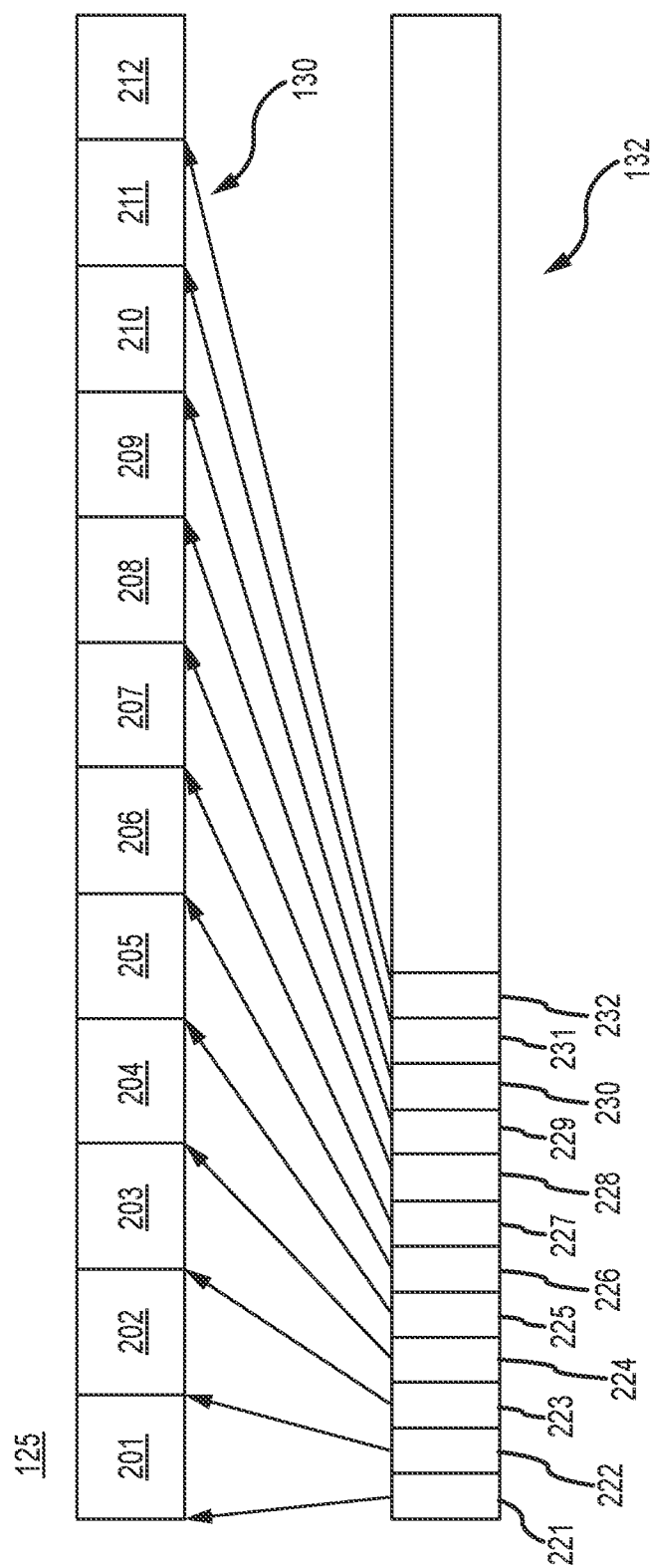
FIG. 2B illustrates an example of a full circular buffer with data segments referenced by addresses stored in a messaging queue.
Figure 2C:
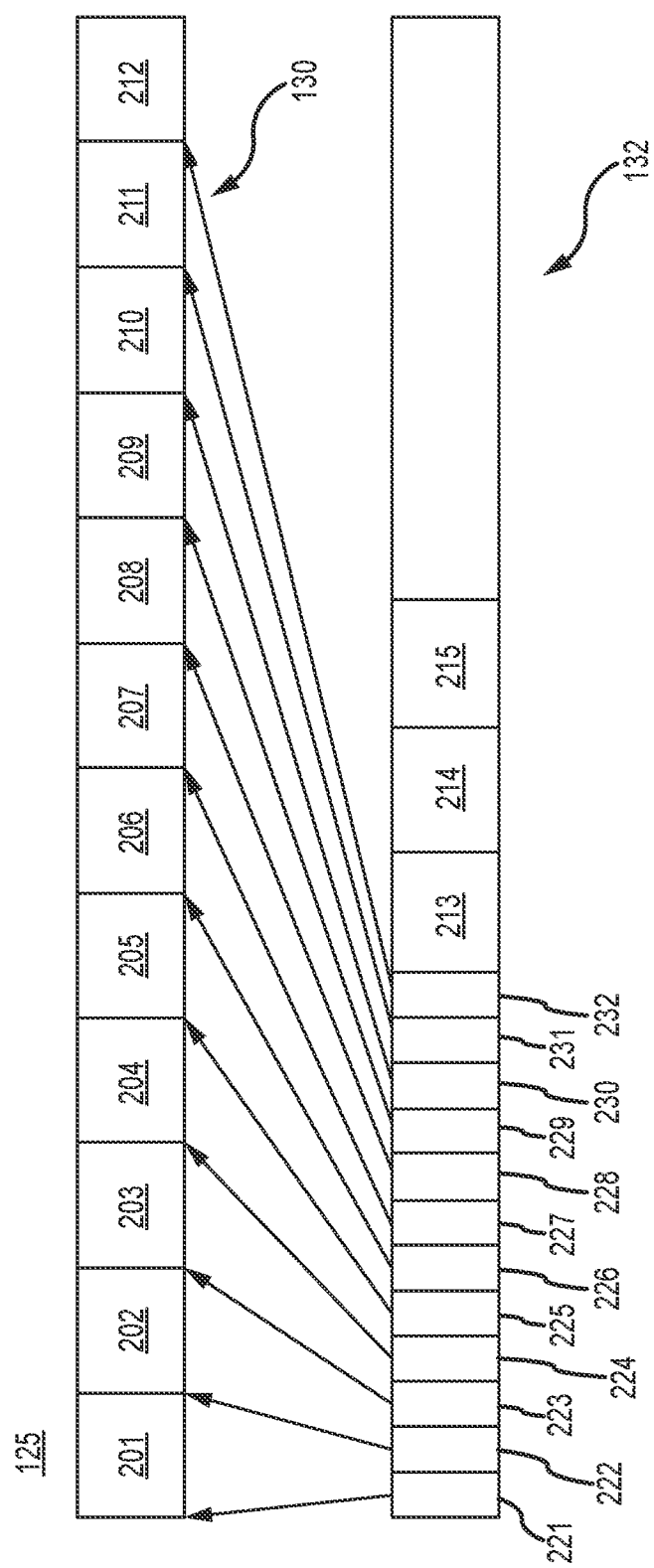
FIG. 2C illustrates an example of a circular buffer with data segments referenced by addresses stored in a messaging queue and overflow data segments stored in the messaging queue.

FIGS. 2A through 2C illustrate examples of buffer 130 and message queue 132 as stored in memory 125, in accordance with various embodiments. Memory 125 may include various physical levels of memory 125 accessible by processor 124 such as, in descending order of read/write speeds when accessed by processor 124, registers, cache, main memory, and permanent storage, for example. In some embodiments, buffer 130 may be stored in cache to improve system performance when reading or writing from data stored in buffer 130. Data segments 201 through 212 shown in FIG. 2 may therefore be stored in buffer 130. The data segments may include chunks of media generated from a media stream or media file received from media source 150.

Server device 120 may have a limited amount of cache available for buffer 130 such that buffer 130 has a maximum storage capacity, also referred to as a maximum length. The maximum length of buffer 130 may be equal to the maximum number of data segments that can be stored in buffer 130. For example, if buffer 130 had a maximum storage capacity of 16 megabytes (MB) and each data segment was 0.96 MB, then the maximum buffer length would be 16 data segments. In another example, if cache had a storage capacity of 16 MB, each data segment was 0.96 MB, and cache held four instances of buffer 130 having an equal maximum length, then the maximum buffer length would be four data segments. Other embodiments could use any number of different buffers, or buffers having equal or unequal lengths.

Server device 120 may use the main memory level of memory 125 to store message queue 132. Message queue 132 is configured to store addresses 221-232, or other pointers that identify the location of data segments stored in buffer 130. Message queue 132 may also be configured to store copies of data segments in response to buffer 130 being full.

With reference to FIG. 2A, buffer 130 and message queue 132 are shown operating in a copy reference mode according to one embodiment. In copy reference mode, message queue 132 is storing addresses 221-227 that point to segments 201-207, respectively. For example, message queue 132 stores address 221 referencing segment 201, which is stored in buffer 130. A consumer thread running on processor 124 (of FIG. 1) reads address 221 and uses address 221 to access the referenced location and to read segment 201 directly from buffer 130.

FIG. 2B shows an example embodiment with buffer 130 full of segments 201 through 212 and message queue 132 storing addresses 221 through 232. Each address stored in message queue 132 points to the location in buffer 130 of a segment. In the example embodiments of FIG. 2B, buffer 130 has a maximum length of twelve since it can hold at most twelve segments in this example. Message queue 132 has 12 addresses, with each address 221 through 232 referencing a segment 201 through 212. The number of addresses stored in message queue 132 is equal to the maximum length of buffer 130, leaving no additional space in buffer 130.

When buffer 130 fills, server device 120 (of FIG. 1) switches to a copy data mode. The switching condition to change from copy reference mode to copy data mode may be, for example, when the number of addresses stored in a message queue meets or exceeds a threshold value, generally relating to the length, fullness, or utilization of buffer 130. Continuing the example, server device 120 may switch to copy data mode in response to the number of addresses stored in message queue 132 threatening to exceed the maximum length of buffer 130. The specific threshold value may be based on the maximum buffer length, the maximum number of addresses stored in message queue 132, or any other condition suitable for preventing server device 120 from overwriting data in buffer 130 before the data is consumed. Various embodiments may set the threshold value to be slightly less than the full capacity of the buffer, if desired.

Referring now to FIG. 2C, buffer 130 and message queue 132 are shown operating in a copy data mode, in accordance with an example embodiment. Server device 120 (of FIG. 1) operating in copy data mode writes data segments directly to message queue 132. Message queue 132 may contain addresses 221 through 232 along with segments 213 through 215. Copying segments 213, 214, and 215 to message queue 132 is typically slower than writing the segments to faster buffer 130, but this tends to avoid overwriting unconsumed segments 201 through 212 stored in buffer 130. The slower processing may also give the consumer thread time to process the backlog of data stored in buffer 130.

Server device 120 continues to operate in copy data mode until the producer thread or consumer thread detect a switching condition. Server device 120 switches to a copy reference mode in response to detecting the switching condition. The switching condition may indicate that buffer 130 is no longer full of segments. For example, server device 120 may switch to a copy reference mode in response to detecting that the number of addresses stored in the message queue is less than (or equal to) a second threshold value. The second threshold value may be set to indicate buffer utilization permits return to copy reference mode. For example, a suitable threshold value might be the constant 1. A constant of 1 would indicate that either 1 or zero addresses are stored in message queue 132. Other suitable threshold values may be calculated using maximum buffer length minus a positive, nonzero constant. Threshold values may also be dynamically calculated depending on the operational constraints and hardware capacity of server device 120. While several examples of threshold values are given herein, these values are intended as examples only and are not limiting.

Figure 3:
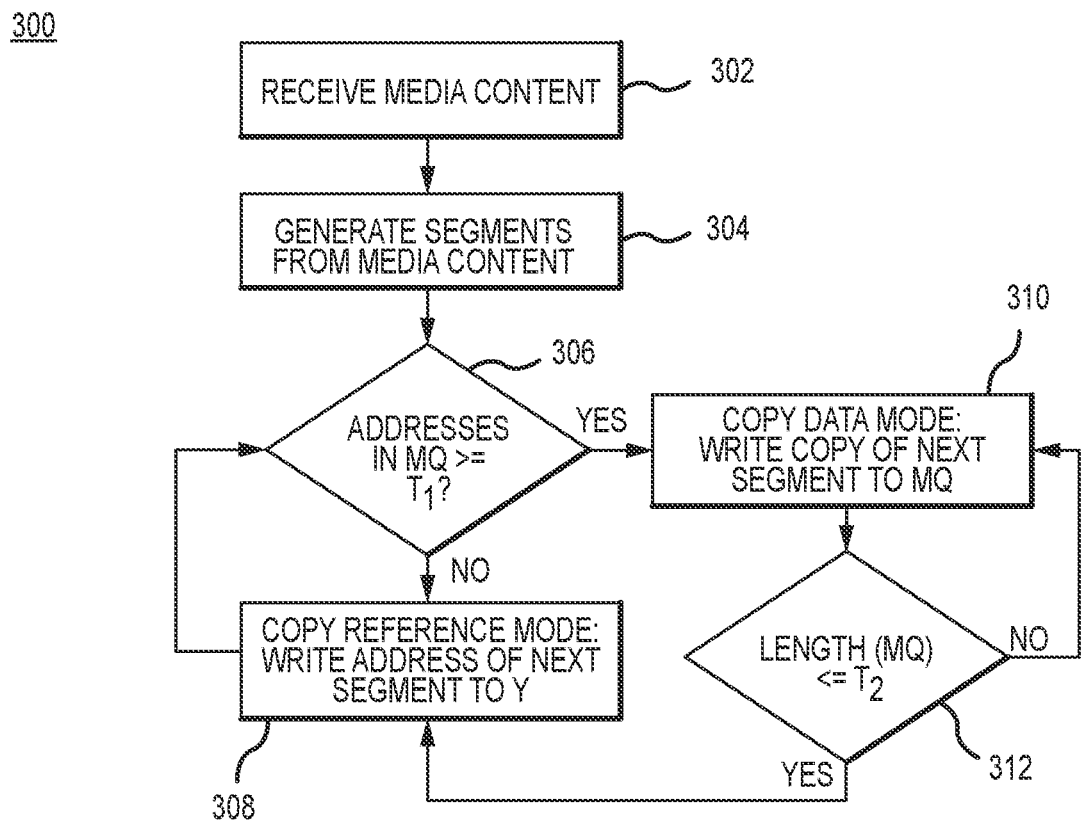
FIG. 3 is a diagram showing an example of a producer process for ingesting media content into a server device in preparation for transmission to a client device on a network.

FIG. 3 shows an example process 300 for encoding media content on server device 120 using buffer 130 and message queue 132 for transmission to client device 102. The various functions described in FIG. 3 may be performed by programmed logic (e.g., software or firmware) stored within memory 105 or 125 and executed by processors 104 or 124, as appropriate. Other embodiments may perform additional functions, and/or may organize the different functions in an equivalent but alternate manner.

Server device 120 may receive media content from media source 150 (Block 302). Media content may be media streams or media files. Media content may include live streams received from media source 150 such as a network broadcast. Media content may also include prerecorded or on demand content.

Server device 120 may generate segments from the media content (Block 304). Segments may include data segments of the media content and metadata. The segments may be multi-bitrate segments encoded at various bitrates to support different levels of video or audio quality on client device 102 based on bandwidth across network 137. The producer thread may initially write data segments to buffer 130 while operating in a copy reference mode.

Server device 120 may check whether a switching condition is met (Block 306). For example, server device 120 may check whether the number of addresses stored in a message queue 132 (MQ) is greater than or equal to a threshold value $T_1$. The threshold value $T_1$ may be based on the maximum length of buffer 130. The threshold value $T_1$ may be a constant value in some embodiments. The maximum length of buffer 130 may be predetermined and fixed, or it may be adapted in operation as desired. The maximum buffer length may be dynamically calculated based on the amount of storage allocated to buffer 130. For example, a buffer with 16 kilobytes (KB) of capacity storing media segments of 1 KB would have a maximum buffer length of 16. Continuing the example, if the buffer's storage capacity were reduced to 4 KB, the maximum length of the buffer would be 4.

Server device 120 may write the address of a data segment in buffer 130 to message queue 132 (Block 308) in response to message queue 132 containing fewer addresses than the maximum length of buffer 130. Stated another way, server device 120 may remain in copy reference mode in response to message queue 132 containing fewer addresses than the maximum length of buffer 130. Server device 120 may remain in copy reference mode until a switching condition is detected to indicate the buffer is nearing its capacity.

Server device 120 may write data segment to the message queue in response to the number of addresses stored in the message queue being greater than or equal to the maximum buffer length (Block 310). Stated another way, server device 120 may switch to copy data mode in response to message queue 132 containing a number of addresses equal to or greater than the maximum length of buffer 130. Server device 120 may write copies of data segments to message queue 132 in response to buffer 130 being full. The data segments may be multi-bitrate segments.

Server device 120 may switch from copy data mode to copy reference mode in response to detecting a second switching condition (Block 312). For example, server device 120 may check whether the number of addresses stored in the message queue 132 is less than (or equal to) a threshold value $T_2$. Server device 120 may also check whether the number of addresses stored in the message queue 132 greater than (or equal to) the threshold value $T_2$. The threshold value $T_2$ may be less than the maximum length of buffer 130. For example, the threshold value $T_2$ may be 1. Addresses referencing data segments stored in buffer 130 may be written to message queue 132 in response to server device 120 being in copy reference mode.

Server device 120 may be an embedded device having limited computing resources available. The use of buffer 130 and message queue 132 as described herein may enable such devices to encode media streams despite limited computing resources. The use of buffer 130 and message queue 132 as described herein may enable server device 120 to ingest and encode streams of live content or other media content susceptible to burst output or similar conditions in which server device 120 ingests media content at a rate greater than the encoded content is consumed. Buffer 130 and message queue 132 may tend to reduce processor and memory costs by reducing the number of memory copy commands used to encode media streams.

Processor 124 of server device 120 may run process 300 on a producer thread. A consumer thread may run in parallel to consume data written to message queue 132. A single threaded processor may support both threads by context switching between separate processes for the consumer thread and the producer thread. In the example illustrated in FIG. 1, operating system 128 may switch context between media encoder 148 (the producer thread) and HTTP server 145 (the consumer thread). The producer thread may variously write references or data segments to buffer 130 and message queue 132 as described above. The producer may write an address to message queue 132 without writing a copy of the data segment to message queue 132. By avoiding a copy command, the producer may tend to optimize CPU and preserve memory bandwidth.

The consumer thread may consume the data from message queue 132. Server device 120 may include a hard condition that the queue length of addresses stored in message queue 132 should not exceed the maximum length of buffer 130 to avoid writing over the data which has not been consumed yet. Server device 120 may detect such scenarios through a callback (e.g., for burst output), by measuring the length of message queue 132, or using an index pointer that tracks the next message location. Server device 120 may switch to copy data mode in response to detecting a scenario where buffer data would be overwritten. In copy data mode, an actual copy of data is written to the message queue instead of writing a reference to the data, so that data will not be lost even if the length of message queue 132 exceeds the maximum buffer length.

Figure 4:
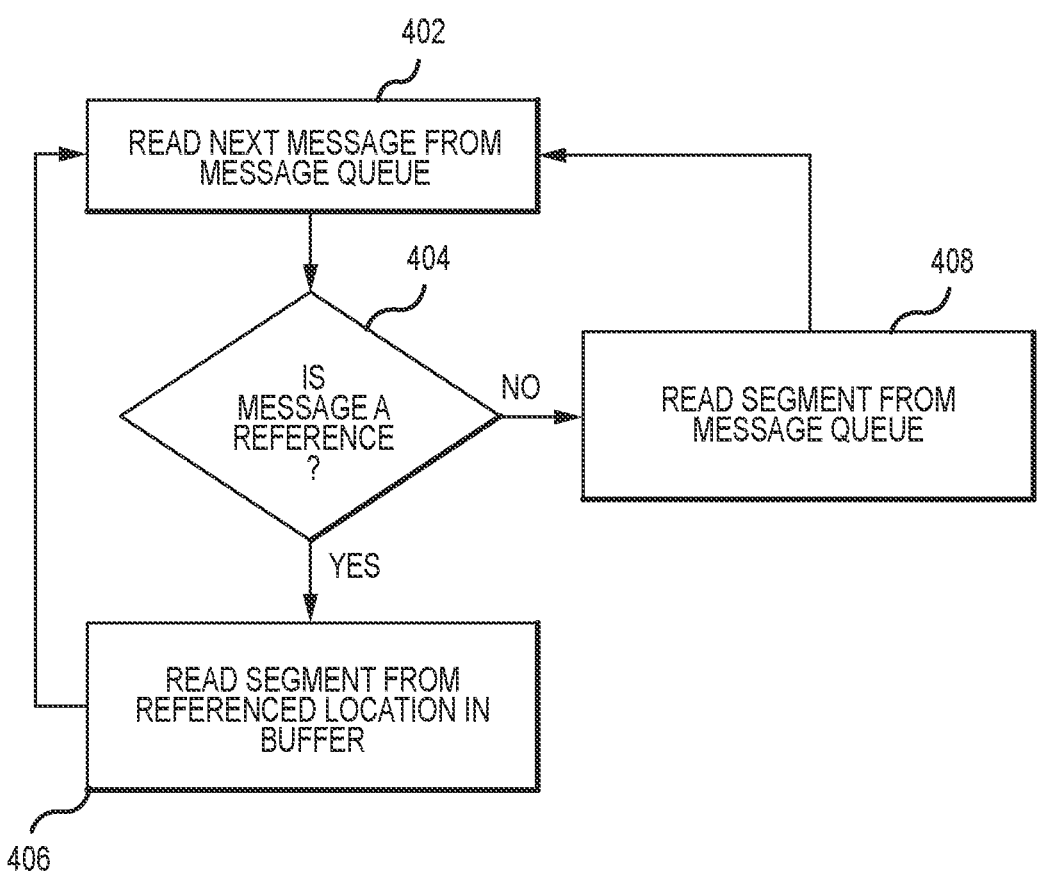
FIG. 4 is a diagram showing an example of a consumer process for ingesting media content into a server device in preparation for transmission to a client device on a network.

FIG. 4 shows an example process 400 for execution by a consumer thread running on server device 120 using buffer 130 and message queue 132. The various functions described in FIG. 4 may be performed by programmed logic (e.g., software or firmware) stored within memory 105 or 125 and executed by processors 104 or 124, as appropriate. Other embodiments may perform additional functions, and/or may organize the different functions in an equivalent but alternate manner.

The consumer thread running on server device 120 reads the next message from message queue 132 (Block 402). The message body may be a reference to a location in buffer 130 or a data segment. The message can include various types of metadata such as, for example, metadata indicating where in memory the message begins and ends. Metadata may also include a flag indicating the message is a reference or a data segment. The message can include an address referencing to a location in message queue 132 where the next message begins. Other types of metadata may be included in the message for use in determining whether the message body is a reference or a segment.

The consumer thread checks whether the message is a reference (Block 404). The consumer thread may use the body of the message or metadata to determine whether the message is a reference or a data segment. The consumer thread may also use callbacks or function calls to communicate with the producer thread and determine whether a message is a reference or a data segment.

If the message is a reference, then the consumer thread reads a data segment from the location in buffer 130 referenced by the message (Block 406). If the message is a data segment, then the consumer thread reads the data segment directly from message queue 132 (Block 408). Reading and writing data segments in buffer 130 stored in cache tends to be faster than reading and writing data segments in message queue 132 stored in main memory.

System 100 using buffer 130 and message queue 132 as described herein may seamlessly handle data streaming when the consumer temporarily lags behind the producer due to asynchronous operation. The system may also handle burst output, where data comes in faster than real time and more than the maximum buffer length of segments are generated. System 100 may switch to reference mode as soon as possible to conserve processing and memory resources, thus tending to minimize bandwidth constraints.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process executed by a processor of a server device to ingest media content, the automated process comprising:

receiving the media content from a media source;

generating a plurality of segments from the media content;

initially writing, to a buffer of the server device, a first segment from the plurality of segments in response to the server device operating in a copy reference mode;

writing, to a message queue of the server device, a first address referencing the first segment of the media content stored in the buffer in response to the server device operating in the copy reference mode;

switching into a copy data mode in response to a number of addresses stored in the message queue being greater than or equal to a first threshold value indicating a high utilization of the buffer; and writing a second segment of the media content to the message queue of the server device in response to the server device operating in the copy data mode.

2. The automated process of claim 1, wherein the first threshold value is equal to a maximum length of the buffer.

3. The automated process of claim 2, wherein the maximum length of the buffer is equal to a maximum number of data segments that fit into the buffer.

4. The automated process of claim 2, wherein the plurality of segments comprises multi-bitrate segments.

5. The automated process of claim 4, wherein the buffer is stored in a cache-level memory of the server device, and
wherein the message queue is in a main memory of the server device with slower read and write speeds than the cache-level memory.

6. The automated process of claim 2, further comprising:
checking whether the number of addresses stored in the message queue is less than or equal to a second threshold value; and
writing, to the message queue, a second address referencing a third segment of the media content stored in the buffer in response to the number of addresses stored in the message queue being less than or equal to the second threshold value.

7. An automated process executed by a processor of a server device to ingest media content, the automated process comprising:
receiving the media content from a media source;
preparing, by a first thread, a plurality of segments of the media content for consumption;
initially writing, by the first thread and to a message queue, an address of a first segment from the segments stored in a buffer, wherein the first thread writes the address in response to the first thread being in a copy reference mode;
switching, by the first thread, into a copy data mode in response to detecting a first switching condition of the message queue, wherein the first switching condition indicates a fullness of the buffer;
writing, by the first thread, a second segment of the media content to the message queue instead of the buffer in response to the processor being in the copy data mode; and
switching, by the first thread, into the copy reference mode in response to detecting a second switching condition of the message queue, wherein the second switching condition indicates a second fullness of the buffer.

8. The automated process of claim 7, wherein detecting the second switching condition of the message queue comprises:
checking whether a number of addresses stored in the message queue is greater than or equal to a threshold value; and
writing, to the message queue, a second address referencing a third segment of the media content stored in the buffer in response to the number of addresses stored in the message queue being greater than or equal to the threshold value.

9. The automated process of claim 8, wherein the threshold value is a maximum length of the buffer.

10. The automated process of claim 7, wherein the segments comprise multi-bitrate segments.

11. The automated process of claim 7, wherein the buffer is stored in a cache-level memory of the server device, and
wherein the message queue is in a main memory of the server device with slower read and write speeds than the cache-level memory.

12. The automated process of claim 7, wherein detecting the second switching condition of the message queue comprises:
checking whether a number of addresses stored in the message queue is less than or equal to a threshold value; and
writing, to the message queue, a second address referencing a third segment of the media content stored in the buffer in response to the number of addresses stored in the message queue being less than or equal to the threshold value.

13. The automated process of claim 7, wherein a second thread consumes the address of the first segment and reads the first segment from the buffer to encode the media content.

14. The automated process of claim 12, wherein the threshold value is equal to 1.

15. A server device comprising a processor, a non-transitory data storage and an interface to a network, wherein the non-transitory data storage is configured to store computer-executable instructions that, when executed by the processor, perform an automated process to ingest media content for transmission on the network, the automated process comprising:
receiving the media content from a media source;
generating a plurality of data segments from the media content;
writing, to a message queue, a first address referencing a first segment of the media content stored in a buffer;
checking whether a number of addresses stored in the message queue is greater than or equal to a first threshold value; and
switching, by the processor, into a copy data mode in response to the number of addresses stored in the message queue being greater than or equal to the first threshold value.

16. The server device of claim 15, wherein the automated process further comprises writing, by the processor and to the message queue, a second segment of the media content in response to the server device being in a copy data mode.

17. The server device of claim 15, wherein the automated process further comprises:
checking whether the number of addresses stored in the message queue is less than or equal to a second threshold value; and
switching, by the processor, into a copy reference mode in response to the number of addresses stored in the message queue being less than or equal to the second threshold value.

18. The server device of claim 17, wherein the automated process further comprises writing, by the processor and to the message queue, a second address referencing a third segment of the media content in response to the server device being in a copy reference mode.

19. The server device of claim 15, wherein the buffer is stored in a cache-level memory of the server device, and
wherein the message queue is in a main memory of the server device with slower read and write speeds than the cache-level memory.

20. The server device of claim 15, wherein the message queue comprises a first-in-first-out queue.

\* \* \* \* \*